United States Patent Office 3,451,648
Patented June 24, 1969

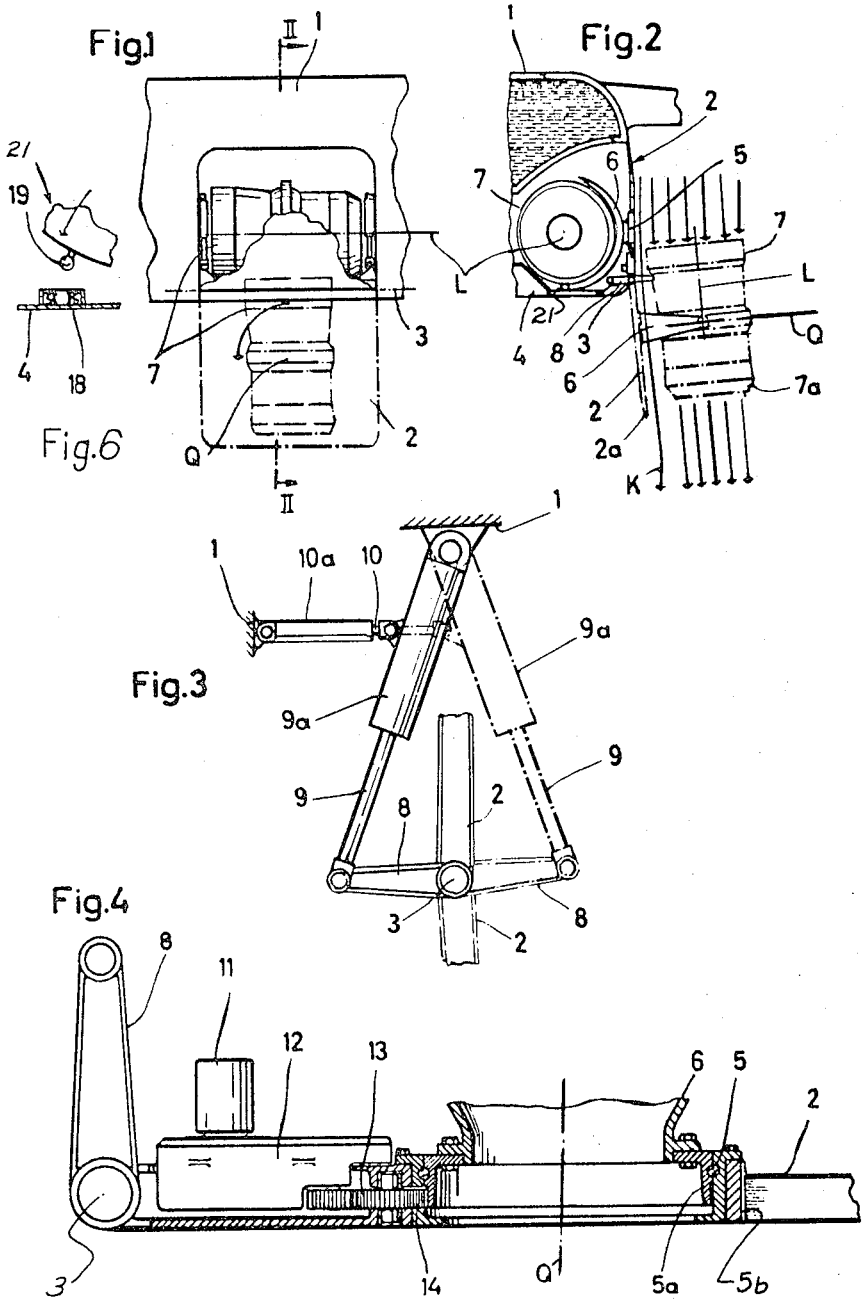

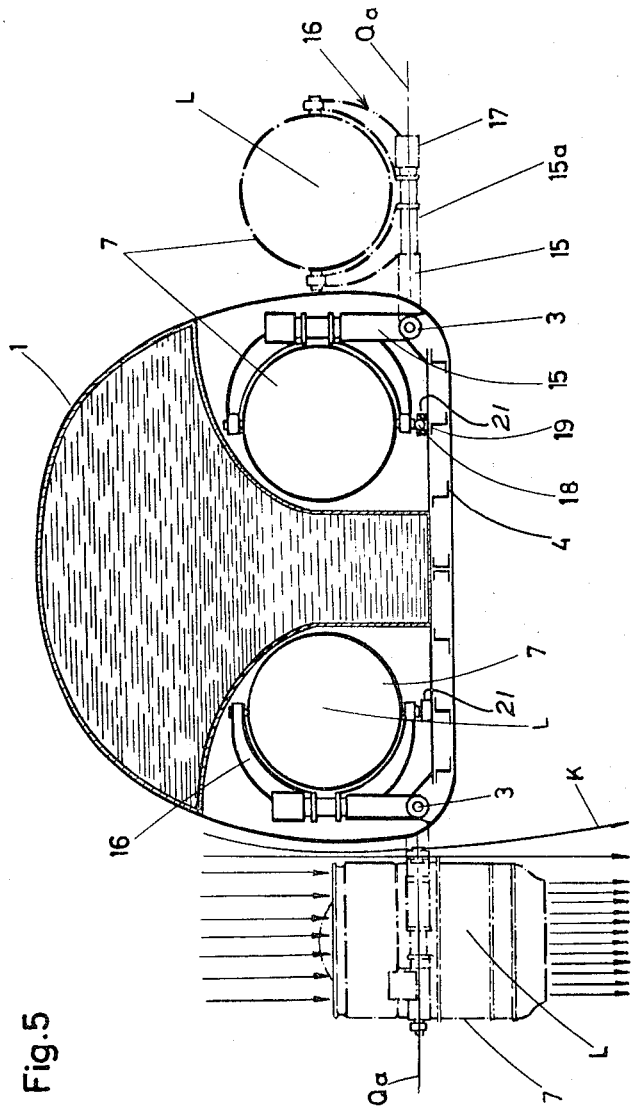

3,451,648
AIRCRAFT HAVING MOVABLE ENGINES FOR
VERTICAL TAKE-OFF AND LANDING
Otto Ernst Pabst, Ottobrunn, and Joseph A. Erich Haberkorn, Riemerling, Germany, assignors to Bolkow G.m.b.H., Ottobrunn, Germany
Filed Aug. 11, 1967, Ser. No. 660,069
Claims priority, application Germany, Aug. 11, 1966,
B 88,428
Int. Cl. B64c 15/14, 29/00; B64d 29/04
U.S. Cl. 244—56    8 Claims

ABSTRACT OF THE DISCLOSURE

The invention concerns an apparatus for moving the lift engines of a vertical take-off and landing aircraft from a storage to an operating position. When in the storage position, the engines are maintained within respective compartments in the fuselage of the aircraft. The engines are stored with their longitudinal axes parallel to the roll axis of the aircraft. In the operating position, the vertical lift engines are located outside of the nacelle of the aircraft. When in this location, the axes of the engines lie along a path generally transverse to the roll axis of the aircraft.

---

This invention generally relates to an engine positioning apparatus for vertical take-off and landing aircraft and more particularly relates to a positioning apparatus for moving the lift engines of a vertical take-off and landing aircraft from a storage position within the fuselage to an operating position outside of the fuselage.

Vertical take-off and landing aircraft are frequently provided with lift fans supported upon moveable arms secured to the sides of the aircraft fuselage. Such lift fans are concealed within the fuselage during cruise and can be swung laterally out of the fuselage into an operating position for vertical and transitional flight. The support arms which carry the lift fans are rotatable about an axis parallel to the roll axis or alternatively about an axis parallel to the pitch axis of the aircraft. Certain disadvantages are encountered in the use of such lift fans. The transmission of driving power through the moveable support arms is difficult and cumbersome. Mechanical power transmission through an angle drive or a cardan joint is, from a structural point of view, relatively complicated and often results in extremely heavy machinery. Alternative drive systems which utilize the hot gases for driving the turbine rotor blades introduce insulation problems in connection with the circulation of hot gases through the nacelle to the fan impeller.

Occasionally, vertical take-off and landing aircraft are provided with lift engines in the bow and the stern of the fuselage. These engines are often vertically stored within the fuselage and mounted to support arms which are extended for vertical flight. The vertical storage of such lift engines within the nacelle requires a relatively large fuselage, and this arrangement is therefore not suitable for high speed aircraft.

A main object of this invention is to provide an improved means for positioning the lift engines of vertical take-off and landing aircraft. A further object is to provide a positioning apparatus which is particularly adaptable for use with aircraft having a relatively slender fuselage. Other features and advantages will hereinafter become apparent to one skilled in the art.

The novel features believed characteristic of this invention are set forth in the appended claims. The invention itself, however, as well as other objects and advantages thereof, may best be understood by reference to the following detailed description of an illustrative embodiment when read in conjunction with the accompanying drawings, wherein:

FIGURE 1 is a fragmentary side view of a portion of the fuselage of a vertical take-off and landing aircraft including a lift engine embodying certain features of this invention.

FIGURE 2 is a sectional view taken substantially on lines II—II of FIGURE 1.

FIGURE 3 is an enlarged detailed view of certain components of the apparatus illustrated in FIGURE 2.

FIGURE 4 is an enlarged fragmentary view of a portion of the apparatus illustrated in FIGURE 2.

FIGURE 5 is a sectional view of the fuselage of a vertical take-off and landing aircraft including an alternate embodiment of this invention.

FIGURE 8 is a sectional view of an aircraft illustrating the rail assembly illustrated in FIGURE 7.

Figure 6:
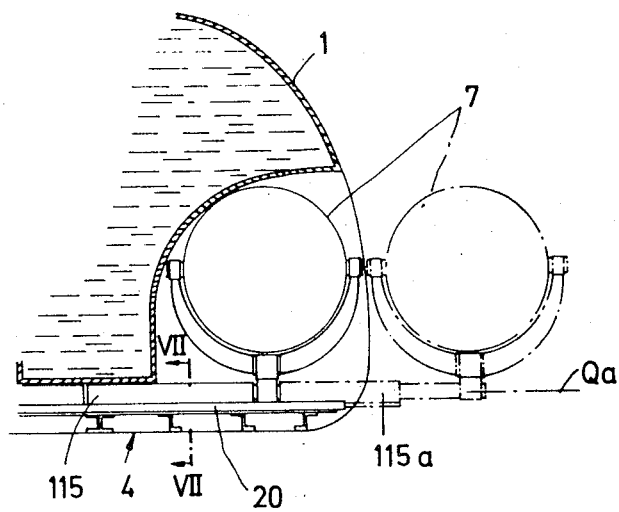
FIGURE 6 is an enlarged fragmentary view of a locking device forming a component of the apparatus illustrated in FIGURE 5.

Briefly, the embodiment illustrated in FIGURE 1 includes an engine support means comprising a flap hingedly secured to the fuselage. During cruise flight the flap is positioned to seal a compartment in the fuselage wherein the lift engine is stored. Hinge means are included which secure the flap to the lower wall of the fuselage. A bracket is connected to a bearing secured to the inner surface of the flap. Secured to the bracket is a vertical lift engine. The positioning means is adapted for moving the lift engine from its storage position wherein the axis of the engine is parallel to the longitudinal axis of the fuselage to a position wherein the engine axis is generally transverse to the roll axis of the aircraft. As will be noted, the location of the axis of rotation of the flap is parallel to the center line of the aircraft and the location of the axis of rotation of the lift engine is transverse to the roll axis of the aircraft, thereby reducing the intensity of the gyroscopic couples created by the moving components.

The embodiment illustrated in FIGURE 1 includes means for selectively swinging the flap through an angle of substantially 180° to a downward position (FIGURE 2). The length of the flap is sufficient to extend beyond the plane of the exhaust orifice of the lift engine when the latter is in the operating position. As will subsequently be described, this feature results in a reduction of recirculation and ground suction effects during operation of the lift engine. The protective position of the flap between the fuselage and the engine serves to aid in the creation of a force, the components of which are directed away from the fuselage tending to urge the engine in an upward direction.

Further, the space defined by the engine and the flap increases the effective engine thrust by increasing the cold air intake through ejector effect and additionally protects the flap as well as the fuselage from excessive heating by the engine exhaust.

With respect to the alternative embodiment of FIGURE 5, one end of a supporting shaft is hingedly secured to the bottom wall of the fuselage adjacent a storage compartment provided within the fuselage. The arm is swung outwardly until the axis thereof is generally parallel to the pitch axis of the aircraft. The positioning apparatus further comprises a sleeve which coaxially receives a piston. The piston is pivotally connected to a bracket supporting the lift engine.

As will be hereinafter further considered, the embodiment of FIGURE 5 permits the balancing of moments around the roll axis of the aircraft during vertical flight while still maintaining maximum thrust from all lift engines. This result is produced by including means for varying the length of the support arms located at both sides of the fuselage so as to affect the moment magnitudes produced by the lift engines about the roll axis of the aircraft. Further, the illustrated embodiments afford ready access to the apparatus for repair work and maintenance of the engines by placing them in a freely accessible position.

More particularly with reference to FIGURE 1, a lift engine 7 is installed within the compartment of the fuselage 1 of an aircraft. A flap 2 is included which can be swung downwardly about an axis of rotation 3 parallel to the roll axis of the aircraft (FIGURE 2). The flap 2 is hingedly secured to the inner wall 4 of the fuselage adjacent the compartment thereby distributing the reaction forces created by the engines to the fuselage. A bearing 5 is installed on the inner surface of the flap 2. The bearing 5 comprises an inner cylindrical race 5a (FIGURE 4) which is secured to the vertex of a curved bifurcated support arm 6. The race 5a is coaxially positioned within an outer race 5b secured to the flap 2. The free ends of the bifurcated support arm 6 are secured to the lift engine 7. In the stored position illustrated in FIGURE 2, the lift engine 7 is nestled within a compartment provided in the fuselage 1. The longitudinal axis L of the engine lies along a path parallel to the roll axis of the aircraft.

Referring to FIGURE 3, a selectively operable actuating device comprises a lever 8 which is rigidly secured to and positioned normally of the flap 2. The lever 8 and the flap 2 rotate about a common axis of rotation 3, and the free end of the lever 8 is rotatably connected to one end of a piston rod 9. The rod is slideably positioned within a cylinder 9a, one end of which is pivotally supported to the fuselage 1. The actuating means additionally includes a second piston 10 having its axis positioned generally transverse to the axis of the piston 9. The piston 10 is slideable within a cylinder 10a. The cylinder 10a is pivotally mounted to the fuselage, and the piston rod 10 is pivotally mounted to the hydraulic cylinder 9a proximate the midpoint thereof.

To move the flap 2 to the operating position wherein the plane of the flap is substantially vertical with respect to the fuselage, fluid is forced into the cylinder 9a causing the piston and the arm 8 to rotate clockwise (as viewed in FIGURE 3) through a right angle. During the retracting movement of the rod 9, fluid is forced into the cylinder 10a extending the rod 10 to the phantom position in FIGURE 3. The movement is completed when the piston rods 9 and 10 are fully extended. During this lateral movement of the engine the longitudinal axis L thereof is parallel to the roll axis of the aircraft. After the flap 2 has reached a fully open position, the lift engine 7 is thereafter rotated approximately 90° by means of a motor 11 and a housed gear train 12 including a pinion gear 13. The pinion gear 13 meshes with gear teeth 14 which are cut into the outer surface of the race 5a. Thus, the lift engine 7 is rotated through an angle of 90° about the axis of rotation "Q" into the operation position shown in phantom in FIGURE 2. As previously mentioned, when in the operative position, the rim 2a of the flap 2 extends beyond the plane of the exhaust orifice 7a of the lift engine 7. This feature provides an advantageous reduction of recirculation and ground suction effects during vertical lift. A space is defined between the engine 7 and the flap 2 which serves to facilitate the flow of cooling air therethrough indicated by an arrow "K."

With reference to the alternate embodiment illustrated in FIGURE 5, those elements which correspond to elements in FIGURES 1 and 2 are similarly numbered. In FIGURE 5, two lift engines 7 are shown secured to supporting shafts 15a. The lift engines 7 are stored within fuselage compartments. Each engine may be selectively swung to a lateral position and thereafter rotated through an angle of approximately 90° to the vertical operating position illustrated in phantom at the left of FIGURE 5. Each of the engines is provided with a support means including an outer sleeve 15 within which is telescopically positioned a support shaft 15a. Secured to the shaft 15a and rotatable therewith is a curved bifurcated support arm 16. The shaft 15a is axially and rotatably moveable within the sleeve 15.

Serving to facilitate movement along and rotation about an axis Qa of the shaft 15a is a drive unit 17. The drive unit 17 is preferably provided at the free end of the shaft 15a. As previously mentioned, the rod is telescopic within the sleeve 15 thus allowing the lateral distance between the fuselage and the engine 7 to be varied so that the effective moment around the roll axis of the aircraft produced by the thrust of the lift engines at both sides of the fuselage can be balanced while maintaining full engine efficiency.

Each of the illustrated embodiments includes a locking device 21. The locking device 21 is illustrated in FIGURE 6 and comprises a ball socket 18 secured to the bottom of the fuselage and a spherical ball connected to the bifurcated support arm 16 adjacent to the bottom of the fuselage. When the engine 7 reaches the storage position, the ball 19 is forced into the socket 18 by the positioning apparatus.

Figure 7:
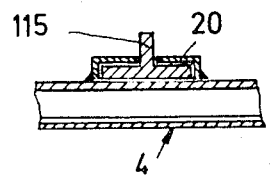
FIGURE 7 is a sectional view of a rail assembly illustrating still another alternate embodiment of this invention.

With reference to FIGURES 7 and 8, the illustrated embodiment may be altered by slideably securing the sleeve 115 to rails 20 which pass into the fuselage and are mounted parallel to the pitch axis and secured to the lower wall 4 of the aircraft. The engines 7 are moved along the axis Qa from their storage position within the storage compartment of the fuselage to their operating position outside of the fuselage. Upon reaching their exterior position, the engines are rotated through 90° to their operating position.

Although preferred embodiments of the invention have been described in detail, it is to be understood that various changes, substitutions, and alterations can be made therein without departing from the spirit and scope of the invention.

We claim:

1. In combination with a vertical take-off and landing aircraft including at least one vertical lift engine and an open compartment within the fuselage of the aircraft for receiving the engine, a positioning apparatus comprising first lateral moving means for moving said engine from a storage position within the fuselage of the aircraft to an exterior position removed from the compartment, the longitudinal axis of said engine when in the exterior position being parallel to the axis of the engine when in the stored position and second means for rotating the axis of said engine through a substantially right angle into an operating position, the axis of said engine when in said operating position being substantially transverse to the axis of said engine in the storage position, the longitudinal axis of said engine when in said storage position being generally parallel to the roll axis of the aircraft.

2. An apparatus in accordance with claim 1 which includes a bifurcated support arm secured to and partially embracing said engine, a locking device for securing said engine to an inner wall of said aircraft fuselage when said engine is in its storage position within said compartment.

3. In combination with a vertical take-off and landing aircraft including at least one vertical lift engine and an open compartment within the fuselage of the aircraft for receiving the engine, a positioning apparatus comprising first lateral moving means for moving said engine from a storage position within the fuelage of the aircraft to an exterior position removed from the compartment, the longitudinal axis of said engine when in the exterior position being parallel to the axis of the engine when in the stored position and second means for rotating the axis of said engine through a substantially right angle into an operating position, a flap hingedly secured to the bottom wall of the fuselage of said aircraft adjacent said compartment and adapted to obstruct at least a portion of the opening of said compartment, a bearing means rotatably mounted to the surface of said flap disposed toward said compartment, a support arm secured to said bearing means so as to provide support to said engine, said bearing means being adapted to permit rotation of said engine to said operating position.

4. An apparatus in accordance with claim 3 wherein selectively operable actuating means are provided for swinging the plane of said flap through an angle of substantially 180° so as to move said engine from its storage position to said exterior position, the axis of said engine when in said exterior position being parallel to the plane of said flap.

5. An apparatus in accordance with claim 4 wherein said flap is of sufficient size to extend beyond the exhaust end of said engine when in said second operating position.

6. An apparatus in accordance with claim 4 whereby said selectively operable actuating means comprises a lever arm rigidly secured to said flap adjacent the axis of rotation of said flap, said lever and said flap having a common axis of rotation, a first hydraulic actuator, a second hydraulic actuator, one end of said first hydraulic actuator being secured to said fuselage and the remaining end of said actuator being pivotally secured to the free end of said lever arm, one end of said second hydraulic actuator being secured to said fuselage and the remaining end of said actuator being pivotally secured to said first hydraulic actuator, whereby said first and second actuators cooperatively function to swing said flap about the axis of rotation thereof.

7. An apparatus in accordance with claim 2 wherein said positioning device further comprises a support shaft one end of which is hingedly secured to the bottom wall of said fuselage adjacent said compartment, the axis of said shaft being generally transverse to the roll axis of said aircraft, a curved bifurcated support arm secured to and supporting said engine, and bearing means rotatably securing said support arm to said shaft for rotation thereabout.

8. An apparatus in accordance with claim 1 comprising support means for supporting said engine, an elongated rail secured to the bottom wall of said fuselage within said compartment and extending along a path transverse to the longitudinal axis of the fuselage, said support means being secured to said rail for movement therealong and extendable out of and retractable into said compartment, and a support arm secured to said engine and pivotally connected to said support means.

References Cited
UNITED STATES PATENTS 2,422,744   6/1947   O'Neil _____ 244—74

FERGUS S. MIDDLETON, *Primary Examiner.*

JAMES E. PITTENGER, *Assistant Examiner.*

U.S. Cl. X.R.

244—12